United States Patent

[11] 3,576,292

[72] Inventor Leo Block
 Temple City, Calif.
[21] Appl. No. 811,047
[22] Filed Mar. 27, 1969
[45] Patented Apr. 27, 1971
[73] Assignee Raypak, Inc.
 Westlake Village, Calif.

[54] VALVE CONTROL SYSTEM
 7 Claims, 1 Drawing Fig.

[52] U.S. Cl. .................................................. 236/78,
 236/84, 60/52, 251/30
[51] Int. Cl. ..................................................... G05d 23/275
[50] Field of Search........................................ 236/78, 84;
 251/30, 33, 75; 60/52 (CO); 91/361

[56] References Cited
 UNITED STATES PATENTS

| | | | |
|---|---|---|---|
| 2,576,246 | 11/1951 | Taylor............................ | 251/30X |
| 2,812,909 | 11/1957 | Dalton............................ | 251/30X |
| 3,358,922 | 12/1967 | Norton........................... | 236/78 |
| 3,375,659 | 4/1968 | Ray................................. | 251/30X |
| 3,393,508 | 7/1968 | Ray................................. | 60/52 |

*Primary Examiner*—William E. Wayner
*Attorney*—Herzig and Walsh

ABSTRACT: The system of the invention is exemplified in an electrical control system for modulating valves particularly gas valves, and especially wherein the valve is of a type which is positioned hydraulically by means of a motor pressurizing a hydraulic liquid. The particular valve is of a type embodying a bleed valve which when opened causes the valve to move to a closed position. The control system is a proportioning bridge type of system using control potentiometers. In the system the valve goes to a closed position when it reaches a predetermined position in its travel, for example, a 20 percent open position. This is accomplished by way of contacts operable when the modulating valve reaches this position causing the said bleed valve to open thereby bringing about closure of the modulating valve. Normal operation is resumed when the controlling potentiometer indicates a demand for valve opening of greater than 20 percent. This is accomplished by way of a sensitive circuit means using an SCR that senses a voltage at the control potentiometer indicative of a demand for valve opening of greater than 20 percent which brings about operation of further contacts which recloses the bleed valve causing normal operation to resume.

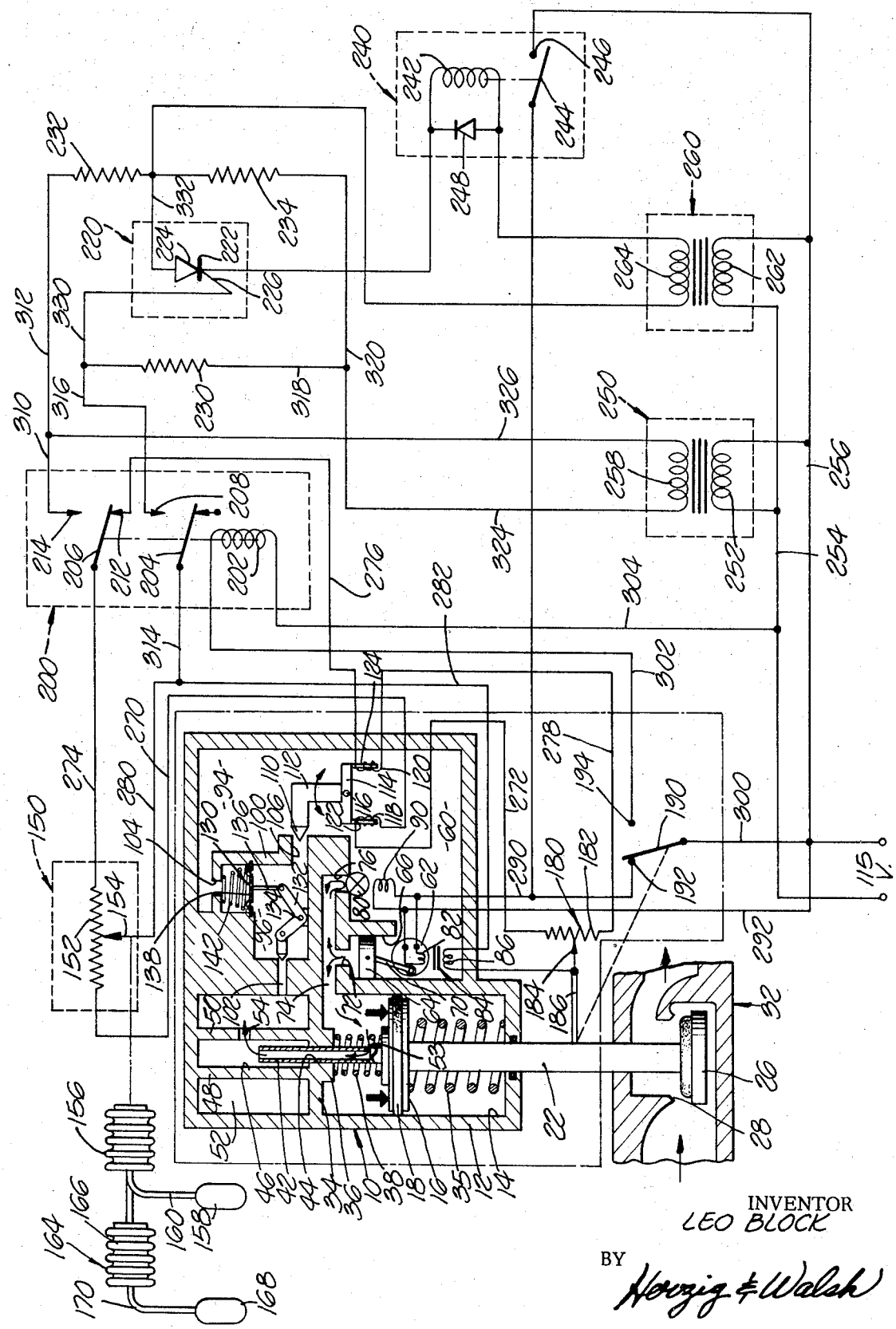

VALVE CONTROL SYSTEM

SUMMARY OF THE INVENTION

The invention is in the field of automatic electrical controls and more particularly in an electrical control system wherein a control element or instrumentality such as, for example, a gas valve is modulatingly controlled in response to controlling conditions such as one or more variable temperatures. The invention is described herein in a preferred exemplary form. In this form of the invention the controlled element or instrumentality is a modulating type of gas valve. This particular gas valve is hydraulically operated, there being an electrically driven pump that pressurizes a cylinder for positioning the gas valve. The hydraulic pressure is automatically controlled in response to the controlling instrument or instruments to position the valve in accordance with heating requirements. In the exemplary embodiment of the invention the control system is an electrical proportioning type using potentiometer-type controllers responsive to one or more temperatures such as indoor and outdoor temperatures in a heating installation.

In the particular hydraulic valve referred there is provided a bleed valve which can be operated to release the hydraulic pressure causing the gas valve to move to a closed position. In typical systems of the type referred to, it is desirable that when the valve has been operated to a predetermined position such as 20 percent open it is desired that it immediately move to a closed position. When the demand from the controlling instrument or instruments indicates a demand corresponding to a valve position of greater than 20 percent open, normal control is resumed. Particular means are provided in the system described herein for effectuating these purposes.

In the exemplary form of the invention contact means are provided which are actuatable by movement of the modulating valve so that in the exemplary 20 percent position, the aforesaid bleed valve is automatically actuated to release the hydraulic pressure to cause the modulating valve to go to a closed position. Particular means are provided for causing the modulating valve to reopen and again operate under normal modulating control from the control instruments. In the exemplary form of the invention a sensitive bridge circuit is provided embodying a switching device which is preferably a silicon controlled rectifier known as an SCR, which is responsive to the potentiometer-type controlling instrument to sense a voltage indicated thereby representative of a control demand corresponding to a valve open position greater than 20 percent. At such position the SCR is caused to fire whereby further contacts are actuated so that the hydraulic pump motor is reenergized, and the bleed valve is closed so as to again permit the hydraulic valve to assume a position corresponding to demands from the controlling instruments, normal operation being resumed.

The system as described is one that adapts itself to utilization with commercial components already available without modification, such as, for example, the hydraulic type of valve; the potentiometer-type proportioning controls, etc. The result is an extremely effective system which in a simple but positive way causes the desired control results to be achieved with the components already available, and the effectuation of this purpose in the manner described is a primary object of the invention.

Another object of the invention is to provide a system of the type described wherein a hydraulically operated valve is caused to go to a fully closed position from a predetermined open position, the valve normally being controlled by a potentiometer-type instrument with sensitive means responsive to the instrument operable to cause the valve to reopen and to cause normal control to be resumed.

Another object is to effectuate the purposes of the system by employment of a sensitive bridge circuit embodying an SCR for sensing an indication by the control potentiometer of a demand for valve opening of greater than 20 percent.

Further objects and additional advantages of the invention will become apparent from the following detailed description and annexed drawing which is a diagrammatic showing of an exemplary form of modulating control valve and control circuit.

As previously stated, the exemplary form of the invention described herein relates to electrical control of a hydraulic-type modulating valve in a gas fired heating system. The installation is one wherein the heating system is controlled by indoor and outdoor thermostats.

The modulating gas valve will be described first after which the control system will be described.

The valve is shown diagrammatically at 10 embodying a housing having internal sections as will be described. At one side of the body 10 is a part 12 forming a cylinder having a bore 14 in which there is a movable piston 16 embodying a sealing O-ring 18. Numeral 22 designates a stem connected to piston 16 and extending from the cylinder 12 on the end of which is a valve member 26 cooperating with a port 28 in a gas valve designated generally at 32. The upper end of the cylinder 12 is formed by the transverse septum 34.

A coil spring 35 surrounds the stem 22 and normally urges the piston 16 upwardly.

Septum 34 has a downwardly extending boss 36 and between this boss and the piston 16 is a biasing spring 38.

Extending upwardly from the piston 16 is a tubular stem 42 which extends through a bore 44 in the septum 34. It extends into a chamber or bore 46 formed by sidewalls 48 and 50 which are within a cavity 52 in the upper part of the body 10. In the sidewall 52 is an orifice 54. Stem 42 has a side aperture 53.

In the lower part of the body 10 on the right-hand side spaced from the cylinder 12 is a cavity identified by numeral 60 forming a hydraulic liquid sump. In this sump is an electric motor 62 which drives a piston 64 that moves in a cylinder 66 formed in the upper part of the sump 60. The motor drives the piston 64 through a connecting rod 70. At the upper part of the cylinder 66 there is a port 72 forming an outlet communicating with a transverse channel 74. The channel 74 has an end port 76 providing communication with the sump 60 by way of an electrically operated bleed valve 80.

The motor 62 has winding 82 which forms the primary of a transformer 84 having secondary winding 86. The electric solenoid bleed valve 80 has an operating winding 90.

At the upper part of the body 10 within it on the right is a further cavity 94 having a cross-sectional configuration as shown. Formed within this cavity is a further space or cavity 96 formed in part by a wall member 100. Connecting the cavity 53 and cavity 96 is channel 102. Cavity 96 has a port 104 communicating with the cavity 94 and a second transverse port or channel 106 communicating with the cavity 94. The end of the port or channel 106 is controlled by a control valve member 110 having an angular stem part 112 attached to an arm 114 of a balancing relay pivoted at 116. The balancing relay has armatures 118 and 120 and associated windings 122 and 124.

The valve 110 is controlled by the balancing relay as will be described presently.

Within the cavity 96 is a pressure relay valve member 130 that controls the port at the end of channel 102. Valve member 130 is connected to a bellcrank lever 132 that is pivoted at 134. One arm of the bellcrank lever 132 is connected to a stem 136 which in turn connects to a flexible diaphragm 138 which is normally biased downwardly by coil spring 142 that extends between the edges of the diaphragm and the periphery of the port 104. The operation of the relief valve 130 will be described in connection with the description of operation of the complete valve.

The valve 26 controls the flow of gas to a gas burner or bank of gas burners in a heating installation in a building, for example, the valve 26 being modulatingly controlled in accordance with temperature requirements as reflected by one or more thermostats as will be described.

The hydraulic pump including the piston 64 is normally in operation, being driven by its motor to pump hydraulic liquid from sump 60 into the cylinder 12 above the piston 16 to tend to force it down against the spring 35, the valve 26 being positioned accordingly relative to the seat 28. The hydraulic liquid above the piston 16 can pass through the port 53 into the tubular stem 42 and then into the chamber 46. From this chamber it can travel through the port 54 into the cavity 52 and then through the channel 102 past the relay valve 130 into the cavity 96. From this cavity it flows through the channel 106 under control of the valve 110 back into the sump 60. The valve 110 controls the rate of flow through the channel 106 and as a result the pressure developed above the piston 16 is controlled. Depending upon the position of valve 110, the hydraulic pump will develop a pressure above the piston 16 which determines the position of piston 16 and position of the valve 26 which will be a predetermined position.

When the winding 90 of valve 80 is deenergized this valve opens and thereby relieving pressure in the cylinder 12 above piston 16 through the channels 74 and 76 with the result that the stem 22 is immediately moved upwardly to closed position of the valve.

Valve 10 is partly diagrammatically shown, being a type already known in the prior art as exemplified in patents such as U.S. Pat. No. 3,375,659.

THE CONTROL SYSTEM

The electrical control system is a proportioning bridge type system embodying a control potentiometer 150 which includes slide wire 152 and slider 154. The slider 154 is adjusted relative to the slide wire 152 by way of an indoor thermostat comprising an expansible and contractable bellows 156 connected to the slider 154 and a thermostatic bulb 158 containing temperature responsive fluid connected to bellows 156 by a tube 160. Numeral 164 designates a second similar thermostat comprising an expansible and contractable bellows 166 and thermostatic bulb 168 containing expansible fluid which is connected to the bellows 166 by a tube 170. The bellows 166 is connected to the bellows 156 by a stem 174 so that the two thermostats jointly determine the position of slider 154 relative to the slide wire 152. In the exemplary embodiment of the invention the thermostat 164 is responsive to outdoor temperature so as to adjust the indoor thermostat in accordance with the heating load requirements.

Numeral 180 designates a balancing potentiometer comprising a slide wire 182 and a slider 184. The slider 184 is mechanically actuated by way of a stem 186 extending from the valve stem 22.

Numeral 190 designates a single pole double throw switch cooperating with contacts 192 and 194.

Numeral 200 designates a relay having a winding 202 which actuates switch blades 204 and 206. Blade 204 cooperates with a contact 208 and blade 206 cooperates with contacts 212 and 214.

Numeral 220 designates a switching device which is a silicon control rectifier that is an SCR comprising electrodes including a cathode 222, anode 224, and gate electrode 226. The SCR is part of a bridge circuit as will be described comprising resistors 230, 232 and 234.

Numeral 240 designates a further relay having a winding 242 which actuates the switch blade 244 cooperating with a contact 246. Across the winding 242 is a diode 248.

Numeral 250 designates a transformer having a primary winding 252 connected to a 115-volt line comprising wires 254 and 256. Transformer 250 has a secondary 258.

Numeral 260 designates a similar transformer connected to the 115-volt line and having a primary 262 and a secondary 264.

The potentiometer controller 150 and the rebalancing potentiometer 180 along with the balancing relay having windings 118 and 120 constitutes a bridge circuit which can be unbalanced by movement of slider 154 whereby to unbalance the balancing relay, with rebalancing by the potentiometer 180 which is repositioned by movement of the valve stem 22. This type of control is basically conventional, being of the type such as shown in U.S. Pat. Nos. 2,134,940 and 2,173,331. One end of slide wire 152 is connected to one end of slide wire 182 by a wire 270 which includes in it the winding 118 and wire 272. The other end of the slide wire 152 is connected to the other end of slide wire 182 by wires including wire 274, contact blade 206, contact 212, wire 276 which extends through winding 120 and wire 278. The slider 154 is connected to the slider 184 by wires including the wire 280, wire 282, and the winding 86 of motor 84. As may be observed the connections as described form a proportioning bridge control circuit.

Switch blade 190 and contact 192 controls the windings 82 and 90 by way of wires 290 and 292.

The switch blade 190 and contact 194 controls the power to the relay 200 by way of wires 300, 302 and 304.

The relay 240 is controlled by the bridge circuit having in it the SCR 220 which is in turn controlled by the relay 200 and controller 150. The switch 244 is able to supply power to the valve 80 and motor 62 as will be described.

The drawing shows relay 200 in deenergized position. When this relay is energized a part of the slide wire 152 of potentiometer 150 becomes part of a bridge circuit including resistors 230, 232, 234 and the SCR 220. When relay 200 is energized the switch blade 206 disengages from contact 212 thus disconnecting the slide wire 152 from the balancing relay and the slide wire 182. Engagement of switch blade 206 with contact 214 connects wire 274 to wires 310 and 312 and resistors 232 and 234 of the bridge circuit which includes the SCR 220. Engagement of switch blade 204 with contact 208 connects wire 314 to wire 316 and to resistor 230 which connects to resistor 234 of the bridge by wires 318 and 320.

The bridge circuit including the SCR 220 is supplied with power from the secondary 258 of transformer 250 by wires 324 and 326.

Connected across the bridge circuit as one leg thereof is the anode 224, cathode 222, and gate electrode 226 of SCR 220, by way of wires 330 and 332.

OPERATION OF THE SYSTEM

The drawing shows the parts in normal operating position. The relay 200 is deenergized. The bridge circuit containing the SCR 220 is inactive. Relay 240 is deenergized. Switch blade 190 is in the position shown. In this position of the parts the potentiometer controller 150 is adjusted by the two thermostats responsive to indoor and outdoor temperature with the slider 154 being moved accordingly. Movement of the slider unbalances the bridge circuit containing the windings 118 and 120 in a manner known in the art causing movement of the valve member 110. The pump 62 is in operation pumping hydraulic fluid into chamber above piston 16. This pressure bleeds through the orifice 53, tube 42, aperture 54, channel 102, cavity 96 and on through port 106 controlled by valve 110. The balancing relay is controlled by the potentiometer to maintain a flow of fluid through valve 110 and it produces a pressure above piston 16 causing it to take a position depending upon the position of the controller. Valve 130 is a pressure relay whereby small sensitive movements of the balancing relay can produce substantial pressure changes above piston 16.

Each time the stem 22 is adjusted the bridge circuit, as described is rebalanced by slider 184 moving relative to slide wire 182.

When the valve 26 reaches a predetermined position as, for example, a 20 percent open position, the switch blade 190 is mechanically actuated to disengage from contact 192 and engage contact 194. Disengagement from contact 192 interrupts the circuit of motor winding 82 and winding 90 of the relief valve 80 which now opens. Opening of this valve relieves the pressure above piston 16 to channels 74 and 76 so that the spring 35 moves the piston upwardly moving valve 26 to fully closed position.

Engagement of switch blade 190 with contact 194 energizes relay 200 causing blade 206 to disengage from contact 212 and to engage contact 214. Blade 204 is now brought into engagement with contact 208. The controller 150 is now effectively disconnected from control of the balancing relay and of the valve 10. The bridge circuit including the SCR 220 is now connected to and controlled from the part of potentiometer 150 between the slider 154 and the right end of the slide wire 152. The bridge circuit containing the SCR senses the voltage between the slider 154 and the right end of slide wire 152, this portion of the slide wire now being connected as a leg in the bridge circuit containing the SCR. The controller 150 continues to be adjusted by the thermostats. When a predetermined voltage is sensed by the bridge circuit containing the SCR as described in the foregoing, which may be a voltage indicative of a demand for a predetermined valve opening such as, for example, 25 percent, the SCR 220 will be caused to fire. In other words the slider 154 and the right part of the slide wire 152 being a leg in the bridge circuit, will unbalance the bridge so as to cause a voltage to appear across the SCR and more specifically on the gate electrode 226 causing it to fire, the bridge circuit containing the SCR getting its power from the secondary 258 of the transformer 250 as previously described. Upon firing of the SCR the relay 240 is energized through the secondary 264 of transformer 260 and through the SCR. Upon energization of relay 242 contact blade 244 engages contact 246 and power is now supplied to motor 62 and winding 90 of the relief valve 80, the contacts of relay 240 effectively bridging the switch formed by blade 190 and contact 192. The relief valve now closes and operation of pump 62 is resumed. Valve 12 will move in opening direction and as soon as it reaches the 20 percent position switch blade 190 will be shifted back into engagement with contact 192. This deenergizes the relay 200 and it moves back into the position shown. The potentiometer controller 150 now reassumes control of the balancing relay and the positioning of the valve 10. The bridge circuit containing the SCR 220 is now deenergized and the relay 240 is deenergized and the parts are back in position as shown in the drawing.

Normal control is reassumed by the controller 150 as soon as the valve 10 opens to the position being called for by the controller.

From the foregoing, those skilled in the art will understand and appreciate the nature and construction of the invention, its operation and the manner in which it achieves and realizes all of the objectives and advantages as set forth in the foregoing.

The foregoing disclosure is representative of a preferred form of the invention and is to be interpreted in an illustrative rather than a limiting sense, the invention to be accorded the full scope of the claim appended hereto.

I claim:

1. In a control system embodying a controller of the potentiometer-type having a slide wire and a slider associated therewith, a condition responsive sensor to automatically adjust the relative positions of the slider and slide wire, a control valve which is modulatingly adjusted in response to the controller over a range lying between a fully open position and a second position which is less than a fully closed position, first means responsive to actuation of said valve to said second position for causing said valve to assume a fully closed position, with control in response to the controller becoming suspended, voltage sensitive means responsive to movement of said controller to a position near one corresponding to said second position of said valve for causing said controller to resume modulating control of said valve.

2. A system as in claim 1 including relay means responsive to said first means for transferring control to said last means.

3. A system as in claim 2 wherein said valve embodies a hydraulically driven means and a hydraulic pump, said first means comprising a valve for releasing hydraulic pressure.

4. A system as in claim 1 wherein said last means including a silicon controlled rectifier and means whereby said rectifier is caused to fire at a predetermined voltage sensed at said controller.

5. A system as in claim 3 comprising a switch for controlling said hydraulic pump and valve.

6. A system as in claim 5 wherein said last means comprises a voltage sensitive circuit including a silicon controlled rectifier and means whereby said rectifier is caused to fire at a predetermined voltage sensed at said controller, and contact means responsive to said circuit for shunting said switch controlling the hydraulic pump and valve.

7. A system as in claim 6 wherein said control system is of a proportioning type embodying a bridge circuit having in it balancing coils and control valve means adjustable thereby for controlling the pressure in the hydraulic means.